(12) United States Patent
Vogel et al.

(10) Patent No.: US 8,770,127 B2
(45) Date of Patent: *Jul. 8, 2014

(54) COUPLING DEVICE FOR A SEMI-CONTINUOUS COMPOSITE RIGGING SYSTEM

(75) Inventors: Scott Louis Vogel, North Kingstown, RI (US); Carrick John Hill, Freemans Bay (NZ)

(73) Assignee: Comprig, LLC, North Kingstown, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,879

(22) Filed: Aug. 24, 2012

(65) Prior Publication Data

US 2012/0318185 A1 Dec. 20, 2012

Related U.S. Application Data

(62) Division of application No. 12/563,873, filed on Sep. 21, 2009, now Pat. No. 8,267,028.

(51) Int. Cl.
*B63B 15/02* (2006.01)
*B63H 9/08* (2006.01)
*B63H 9/10* (2006.01)

(52) U.S. Cl.
USPC .......................................... 114/223; 114/111

(58) Field of Classification Search
USPC .............................. 114/102.1, 108–115, 223; 138/111–117; 285/125.1–133.6, 152.1
See application file for complete search history.

(56) References Cited

U.S. PATENT DOCUMENTS

| | | | | | |
|---|---|---|---|---|---|
| 2,284,937 | A | * | 6/1942 | Wood | 285/122.1 |
| 3,510,156 | A | * | 5/1970 | Markowz | 285/122.1 |
| 4,632,050 | A | * | 12/1986 | Rupp | 114/255 |
| 5,305,797 | A | * | 4/1994 | Roy, Sr. | 138/108 |
| 5,435,044 | A | | 7/1995 | Ida | |

(Continued)

FOREIGN PATENT DOCUMENTS

| | | | | | |
|---|---|---|---|---|---|
| EP | 1988011 A2 | * | 11/2008 | | B63B 15/02 |
| ES | 2288443 | | 1/2008 | | |
| ES | 2292376 | | 3/2008 | | |
| FR | 2636301 A1 | * | 3/1990 | | B63H 9/10 |

OTHER PUBLICATIONS

"Introducing SRC 35—Hall Seamless Carbon Rigging," Scuttlebutt Sailing Forum: Industry News: Equipment and Services, http://forum.sailingscuttlebutt.com/cgi-bin/gforum.cgi?do=post_view_printable;post=6693;guest=5732862, Nov. 17, 2008.

(Continued)

*Primary Examiner* — Ajay Vasudeva
(74) *Attorney, Agent, or Firm* — Foley & Lardner LLP

(57) ABSTRACT

A coupling device for a semi-continuous composite rigging system is provided including a first body portion and a second body portion. The first body portion comprises a first end and a second end. A first passage and a second passage extend from the first end to the second end, where the second passage is coextensive with the first passage at the first end and at the second end. The first body portion is configured to receive a continuous shroud and to allow the continuous shroud to pass therethrough. The second body portion is coupled to the first body portion and is configured to receive an end portion of a discontinuous shroud.

21 Claims, 11 Drawing Sheets

(56) References Cited

U.S. PATENT DOCUMENTS

| | | | |
|---|---|---|---|
| 5,458,076 A * | 10/1995 | Loutrel et al. | 114/111 |
| 7,137,617 B2 | 11/2006 | Sjostedt | |
| 7,540,250 B2 | 6/2009 | Sjostedt | |
| 8,267,027 B2 * | 9/2012 | Sjostedt et al. | 114/111 |
| 8,267,028 B2 * | 9/2012 | Vogel et al. | 114/111 |
| 2004/0154516 A1 | 8/2004 | Thomas | |
| 2006/0120672 A1 | 6/2006 | Cody et al. | |
| 2009/0158984 A1 | 6/2009 | Sjostedt et al. | |
| 2011/0283484 A1 * | 11/2011 | Hall et al. | 24/115 R |

OTHER PUBLICATIONS

"Hall Seamless Carbon Rigging," Hall Spars and Rigging, http://www.hallspars.com/index.php?option=com_content&view=category&layout=blog&id=68&Itemid=97, Apr. 29, 2009.

"The Hall Method," Hall Spars and Rigging, http://www.Hallspars.com/index.php?option=com_content&view=category&layout=blog&id=49&Itemid=84, Apr. 29, 2009.

"Standard Rigging," Gottifredi Maffioli, http://www.gottifredimaffioli.com/en/products/yachting/undirectional_composite_table.php, Apr. 29, 2009.

"Powerlite PBO Rigging The Next Generation FAQ's," Powerlite PBO Rigging, http://powerliterigging.com/faq_general.asp, 2006.

"Powerlite PBO Rigging The Next Generation FAQ's," Powerlite PBO Rigging, http://powerliterigging.com/faq_rigging-comparison.asp, 2006.

"Powerlite PBO Rigging The Next Generation FAQ's," Powerlite PBO Rigging, http://powerliterigging.com/faq_technical.asp, 2006.

"Powerlite PBO Rigging The Next Generation FAQ's," Powerlite PBO Rigging, http://powerliterigging.com/faq_durability.asp, 2006.

"Powerlite PBO Rigging Advanced Technology Termination Technology," Powerlite PBO Rigging, http://powerliterigging.com/termination-tech.asp, 2006.

"Powerlite PBO Rigging Advanced Technology Anatomy," Powerlite PBO Rigging, http://powerliterigging.com/anatomy.asp, 2006.

"Powerlite PBO Rigging America's Cup Technology Maximize Performance," Powerlite PBO Rigging, 2005.

"Selection Guide," Powerlite PBO Rigging, believed to be available prior to the Sep. 21, 2009 filing date of the present application.

Falsone, Jesse, "Is it Time to Upgrade to PBO?," Sailing World, http://www.sailingworld.com/article_print.jsp?ID=43122, Jul. 7, 2006.

"Navtec Launches Continuous PBO Fiber Rigging," Lewmar News, http://en.lewmar.com/news/index.aspx?newsid=329, 2007.

"Easy Rigging Lightweight Sailboat Rigging," Easy Rigging, believed to be available prior to the Sep. 21, 2009 filing date of the present application.

"Continuous or Discontinuous Rigging," believed to be available prior to the Sep. 21, 2009 filing date of the present application.

International Search Report and Written Opinion for PCT/US2010/049721, mail date Dec. 17, 2010, 9 pages.

"Navtec Fiber Rigging 2009," Navtec Performance Rigging, a division of Lewmar, 2008, believed to be available prior to the Sep. 21, 2009 filing date of the present application.

* cited by examiner

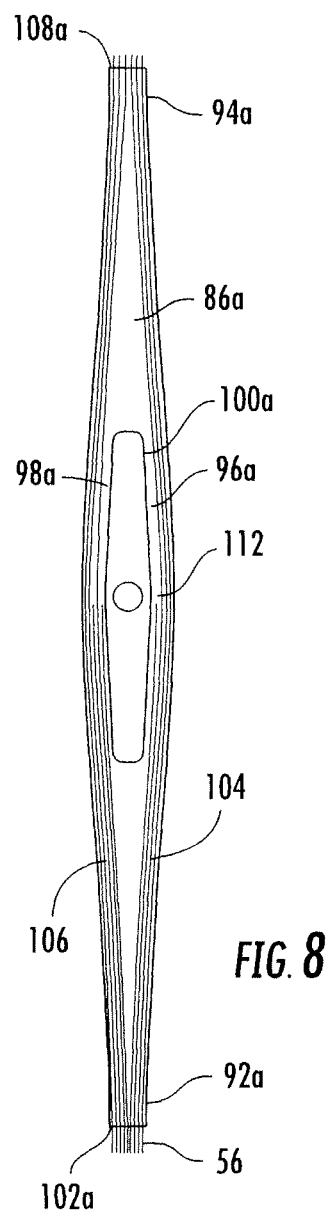
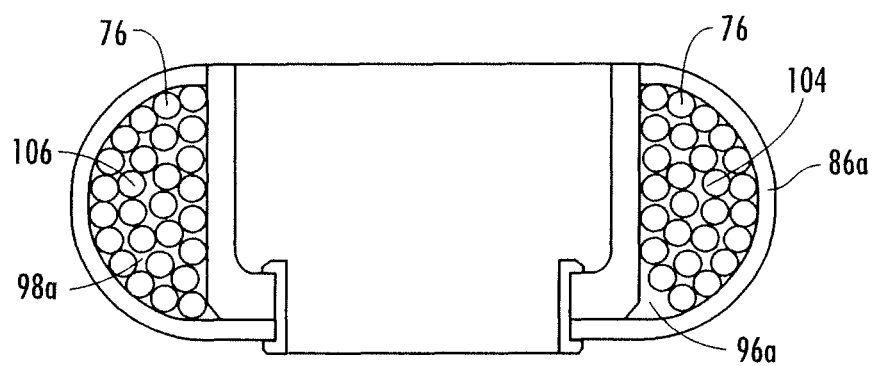
FIG. 8
FIG. 9

COUPLING DEVICE FOR A SEMI-CONTINUOUS COMPOSITE RIGGING SYSTEM

CROSS-REFERENCE TO RELATED PATENT APPLICATION

This application is a Divisional Application of U.S. patent application Ser. No. 12/563,873, filed Sep. 21, 2009, now U.S. Pat. No. 8,267,028, the contents of which are herein incorporated by reference in its entirety.

BACKGROUND

The present invention relates generally to standing rigging systems for a sailboat. A standing rigging system is configured to hold the mast of a sailboat upright, in a generally vertical orientation. The configuration of a standing rigging system can significantly affect the performance of a sailboat (e.g., because wind exerts force on the mast, spreaders, rigging system, etc. of a sailboat). Some performance-related aspects of standing rigging that can be improved include reducing weight, reducing elongation (stretch), reducing wind drag (windage), reducing the need to replace tensioning members (e.g., the risk of the tensioning members breaking, etc.), and increasing the lifespan of the tensioning members.

SUMMARY

According to one embodiment, a semi-continuous composite rigging system for a sailboat comprises a first continuous shroud that extends generally vertically and includes a first end portion and a second end portion; a second continuous shroud that extends generally vertically and includes a first end portion and a second end portion; a plurality of generally diagonal discontinuous shrouds that each include a first end portion and a second end portion; and a plurality of terminal coupling devices that are configured to couple the end portions of the shrouds to the sailboat.

According to another embodiment, a coupling device for a semi-continuous rigging system comprises a first body portion configured to receive a continuous shroud and to allow the continuous shroud to pass therethrough, and a second body portion coupled to the first body portion and configured to receive an end portion of a discontinuous shroud. The first body portion comprises a first end, a second end, a first passage extending from the first end to the second end, and a second passage extending from the first end to the second end. The second passage of the first body portion is coextensive with the first passage at the first end and at the second end.

BRIEF DESCRIPTION OF THE DRAWINGS

FIG. 8 is a cross section of the hybrid coupling device of FIG. 5A taken along the line 8-8.

FIG. 9 is a cross section of the hybrid coupling device of FIG. 5A taken along the line 9-9.

DETAILED DESCRIPTION

Figure 1:
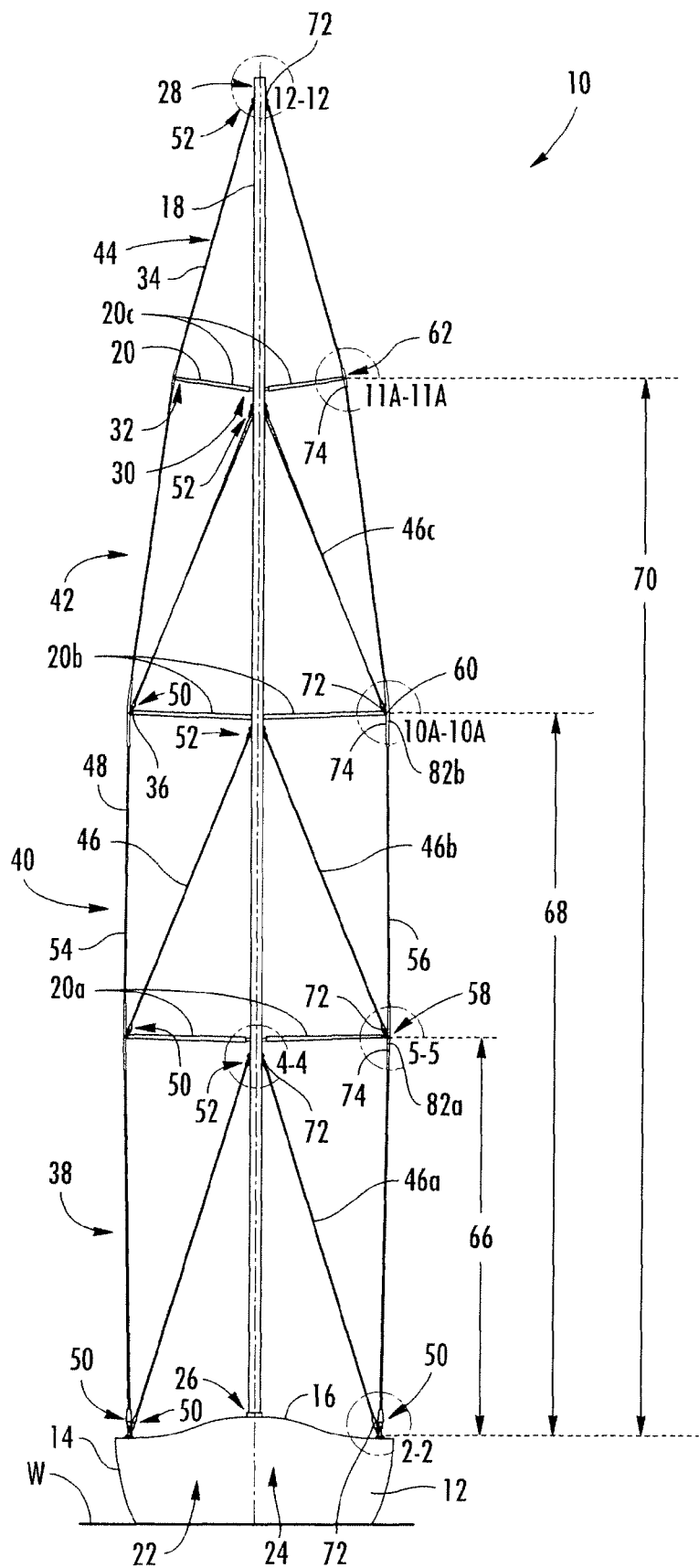
FIG. 1 is a rear elevation view of a semi-continuous composite rigging system according to a first exemplary embodiment.

Referring to the FIGURES generally, a standing rigging system is shown as a semi-continuous composite rigging system according to exemplary embodiments. The semi-continuous rigging system includes both discontinuous and continuous tensioning members or shrouds, providing for customization, tuning, or balancing of various sailboat performance considerations.

A discontinuous shroud is a shroud that is coupled to a sailboat (or other structure) by a terminal coupling device at its end portions by terminal coupling devices; a discontinuous shroud is not coupled at any intermediate points or locations between its end portions. In a discontinuous rigging system, only discontinuous tensioning members or shrouds are used. On a sailboat, the number of discontinuous shrouds depends in part on the number of spreaders. The terminal coupling devices used to couple the end portions of the discontinuous shrouds typically increase weight and windage (e.g., because of materials used, the shape of the terminal coupling devices, etc.). Terminal coupling devices can also decrease performance while sailing (e.g., because of fatigue, etc.).

A continuous shroud is a shroud that is coupled to a sailboat (or other structure) at its end portions and at least one intermediate location between its end portions. The end portions of a continuous shroud are coupled by terminal coupling devices, while the one or more intermediate locations are coupled by non-terminal coupling devices. Non-terminal coupling devices are typically relatively lightweight compared to terminal or end coupling devices.

In one exemplary embodiment, a continuous rigging system utilizes only continuous tensioning members. As the spreaders of a boat are generally not all the same length, some sections or portions of a continuous shroud in a continuous rigging system are generally diagonal shroud sections or portions (e.g., disposed generally diagonally, at an angle relative to the mast of the boat) to provide support for the mast.

In one exemplary embodiment, the continuous tensioning members of a continuous rigging system are made up of bundles of fiber composite tensioning member elements in which a percentage of the total number of fiber composite tensioning member elements do not go from the deck to the top of the mast, but branch off after passing through one or more non-terminal coupling devices and attach to the mast to also create a diagonal mast supporting tensioning member. A non-terminal coupling device may be provided in this embodiment as a "Y" branch metallic or composite tube that provides for a percentage of the fiber composite tensioning member elements to be re-directed at the necessary angular deflection to become a diagonal shroud section. The various branches of the "Y" tube do not need to be of equal length and can be tailored to suit the strength requirements of the rigging support system. The splitting off of fiber composite elements along the length of the mast further reduces weight and windage and tapers the rigging system in steps out over the length of the mast so that material (and weight) is not provided except where necessary. This concept is discussed in more detail in U.S. Pat. No. 7,540,250, entitled, "Fiber Composite Continuous Tension Members for Sailboat Masts and Other Tensioning Member Supported Structures," which is hereby incorporated by reference in its entirety.

Such a branched configuration typically requires numerous directional or angular changes (e.g., defining bends, etc.) at one or more locations along the length of the continuous shroud. The locations on a continuous shroud having a directional or angular changes are more highly stressed than those locations that are substantially straight. If a continuous shroud breaks or is otherwise damaged, replacement may be cumbersome, expensive, or not possible. Discontinuous shrouds are typically easier and more cost-effectively replaced than continuous shrouds.

The semi-continuous composite rigging system disclosed herein provides for utilization of discontinuous and continuous tensioning members in strategic combination (e.g., taking into consideration the benefits, tradeoffs, etc., between features and performance characteristics of discontinuous rigging systems and continuous rigging systems, etc.) to achieve a desired balance of performance considerations (e.g., weight, windage, the likelihood of needing to replace a tensioning member, reliability, presence of bends in a shroud, etc.) for a sailboat. For example, terminal coupling devices typically increase weight and windage (e.g., because of their shape, materials used, etc.) and can decrease the performance while sailing. Non-terminal coupling devices are typically lighter, may be made more aerodynamic, and may be more reliable than terminal coupling devices. A semi-continuous rigging system eliminates some terminal coupling devices by using continuous shroud(s) in place of multiple discontinuous shrouds. The continuous shrouds enable use of non-terminal coupling (potentially having the advantages of decreased weight, windage, etc.) devices at attachment points where a terminal coupling device would be required with a discontinuous shroud. This substitution may be particularly helpful for reducing weight aloft in the sailboat. That being said, continuous shrouds typically experience greater stress (e.g., because of their increased length, bends/branched portions, etc.) and are more difficult and expensive to replace than discontinuous shrouds.

Referring to FIG. 1, a semi-continuous composite rigging system 10 is shown according to an exemplary embodiment on a sailboat 12 viewed from the stern end. Sailboat 12 includes a hull 14, a keel, a deck 16, a mast 18, and a plurality of spreaders 20. Hull 14 of sailboat 12 is shown partially submerged in water. Deck 16 extends substantially horizontally between a port side 22 and a starboard side 24 of sailboat 12. Mast 18 includes a bottom portion 26 shown substantially opposite a top portion 28. Mast 18 is configured to provide vertical support for one or more sails. Bottom portion 26 of mast 18 is shown coupled or secured to deck 16 and extending substantially vertically upward from deck 16. Top portion 28 of mast 18 is disposed distal to deck 16.

Spreaders 20 are shown as elongated support members each having a fixed end 30 and a free end 32. Spreaders 20 are configured to help provide transverse (e.g., side-to-side, etc.) support and/or stabilization for mast 18 by deflecting the shrouds, and, thus, enabling the shrouds to better support the mast. Spreaders 20 are shown disposed substantially horizontally and substantially transverse to mast 18. Fixed ends 30 of spreaders 20 are disposed proximate to mast 18 and may be coupled or secured to mast 18 by any means known in the art. Free ends 32 of spreaders 20 are shown disposed to port side 22 or to starboard side 24 of sailboat 12, distal to mast 18. In the exemplary embodiment shown, spreaders 20 on port side 22 are the mirror image of spreaders 20 on starboard side 24 of sailboat 12, though, the spreaders may be sized, shaped, numbered, and/or arranged in any manner to achieve the desired transverse support/stabilization.

Referring further to FIG. 1, the plurality of spreaders 20 includes a first set of spreaders 20a, a second set of spreaders 20b, and a third set of spreaders 20c according to an exemplary embodiment. Each set of spreaders is shown having one spreader on port side 22 of sailboat 12 and one spreader on starboard side 24, the spreaders on port side 22 being the mirror image of the spreaders on starboard side 24. First set of spreaders 20a is shown disposed proximate to deck 16 and below second set of spreaders 20b. Second set of spreaders 20b is shown disposed above first set of spreaders 20a and below third set of spreaders 20c. Third set of spreaders 20c is shown disposed above second set of spreaders 20b and generally below top portion 28 of mast 18. Third set of spreaders 20c is shown tilted slightly upward at free ends 32 towards top portion 28 of mast 18. Please note spreaders 20 will be used to refer to the spreaders collectively, whereas, 20a, 20b, and 20c will be used to refer to each set of spreaders or an individual spreader of that spreader set. Generally, a sailboat may have more than or less than three sets of spreaders.

Referring further to FIG. 1, semi-continuous composite rigging system 10 includes a plurality of elongated tensioning members or shrouds 34. Shrouds 34 (e.g., cables, ropes, lines, wires, cords, etc.) are configured to provide support for mast 18 in order to keep mast 18 substantially vertical and stable. Shrouds 34 are coupled to sailboat 12 at a plurality of attachment points 36 (e.g., mast 18, spreaders 20, deck 16, and/or other component elements of sailboat 12). The locations of these attachment points, the orientation of the shrouds extending between or partially between these attachment points, and the tension within each shroud may be adjusted to help achieve the desired support for mast 18. A typical standing rigging configuration will have shrouds or sections/portions thereof that are disposed generally vertically and those that are disposed generally diagonally (e.g., at a angle, jumpers, etc.) relative to mast 18.

Referring further to FIG. 1, semi-continuous composite rigging system 10 is shown symmetrical and tiered, including a first tier 38, a second tier 40, a third tier 42, and a fourth tier 44 according to an exemplary embodiment. First tier 38 is shown defined generally between and at least partially including deck 16 and first set of spreaders 20a. Second tier 40 is shown defined generally between and at least partially including first set of spreaders 20a and second set of spreaders 20b. Third tier 42 is shown defined generally between and at least partially including second set of spreaders 20b and third set of spreaders 20c. Fourth tier 44 is shown defined generally between and including fourth set of spreaders 20d and top portion 28 of mast 18. In the exemplary embodiment shown, semi-continuous composite rigging system 10 is symmetrical, and, accordingly, the tiers are substantially identical on both port side 22 and starboard side 24. In other exemplary embodiments, the semi-continuous composite rigging system may be unsymmetrical and/or have more or fewer than four tiers.

Referring further to FIG. 1, plurality of shrouds 34 includes a plurality of discontinuous shrouds 46 and a plurality of continuous shrouds 48. Each discontinuous shroud 46 and each continuous shroud 48 includes a first end portion 50 and a second end portion 52. Second end portions 52 are shown disposed generally above first end portions 50 (e.g., the second end portions are generally greater distances from the deck than the first end portions, etc.). Each discontinuous shroud 46 is coupled at only its first end portion 50 and its second end portion 52 to attachment points on sailboat 12. Each continuous shroud 48 is coupled to attachment points on sailboat 12 at its first end portion 50, at its second end portion 52, and at least one intermediate location disposed between its first end portion 50 and its second end portion 52. It should be noted that end portions may be configured in any of a variety of ways, including, but not limited to, as a grouping of fibrous end points, as a loop of one or more tensioning member elements, as a winding, etc.

Referring further to FIG. 1, plurality of discontinuous shrouds 46 is shown including a pair of first discontinuous shrouds 46a, a second pair of discontinuous shrouds 46b, and a third pair of discontinuous shrouds 46c according to an exemplary embodiment. Each discontinuous shroud 46 is shown as a substantially straight, generally diagonal shroud (e.g., disposed at an angle to the mast, etc.) and substantially corresponding to a single tier of semi-continuous composite rigging system 10. First discontinuous shrouds 46a are shown substantially corresponding to first tier 38 of semi-continuous composite rigging system 10, second discontinuous shrouds 46b are shown substantially corresponding to second tier 40 of semi-continuous composite rigging system 10, and third discontinuous shrouds 46c are shown substantially corresponding to third tier 42 of semi-continuous composite rigging system 10. Discussing the discontinuous shrouds at starboard side 24 of sailboat 12 by way of example, and not by way of limitation, first discontinuous shroud 46a is shown coupled at first end portion 50 to deck 16 at a location distal to mast 18 and at second end portion 52 to mast 18 proximate to first spreader 20a. Second discontinuous shroud 46b is shown coupled at first end portion 50 to free end 32 of first spreader 20a and at second end portion 52 to mast 18 proximate to second spreader 20b. Third discontinuous shroud 46c is shown coupled at first end portion 50 to free end 32 of second spreader 20b and at second end portion 52 to mast 18 proximate to third spreader 20c. In other exemplary embodiments, one or more of the discontinuous shrouds may be disposed at an orientation other than generally diagonal (e.g., generally vertical) or disposed at a variety of different angle(s) relative to the mast. In other exemplary embodiments, one or more of the discontinuous shrouds may correspond to multiple tiers. For example, a discontinuous shroud may be coupled to the deck at its first end portion and be coupled to the mast proximate to the second spreader at its second end portion. Please note that 46 will be used to refer to the discontinuous shrouds collectively, whereas, 46a, 46b, and 46c will be used to refer to each pair of discontinuous shrouds or individual shrouds of those pairs.

Referring further to FIG. 1, plurality of continuous shrouds 48 is shown including a first continuous shroud 54 and a second continuous shroud 56 according to an exemplary embodiment. Please note that 48 will be used to refer to the continuous shrouds collectively, whereas, 54, 56 will be used to refer to the continuous shrouds individually.

Referring further to FIG. 1, continuous shrouds 48 are shown extending generally vertically and continuously from deck 16 to top portion 28 of mast 18 according to an exemplary embodiment. First continuous shroud 54 and second continuous shroud 56 are each shown substantially corresponding to all four tiers of semi-continuous composite rigging system 10, the sections of each continuous shroud corresponding to each tier being generally vertical. First continuous shroud 54 and second continuous shroud 56 are also each shown coupled to sailboat 12 at three intermediate locations between first end portions 50 and second end portions 52. Discussing second continuous shroud 56 by way of example, and not by way of limitation, second continuous shroud 56 is shown coupled at a first intermediate location 58, a second intermediate location 60, and a third intermediate location 62 to sailboat 12. First intermediate location 58, second intermediate location 60, and third intermediate location 62 are disposed between first end portion 50 and second end portion 52 of second continuous shroud 56. At first intermediate location 58, a first distance 66 from first end portion 50, second continuous shroud 56 is shown coupled to first spreader 20a at or proximate to free end 32. At second intermediate location 60, a second distance 68 from first end portion 50, second continuous shroud 56 is shown coupled to second spreader 20b at or proximate to free end 32. At third intermediate location 62, a third distance 70 from first end portion 50, second continuous shroud 56 is shown coupled to third spreader 20c at or proximate to free end 32. Generally, a continuous shroud may be coupled to a sailboat at one or more intermediate locations.

Referring further to FIG. 1, a plurality of terminal or end coupling devices 72 couple to sailboat 12 first end portions 50 and second end portions 52 of discontinuous shrouds 46 and continuous shrouds 48 according to an exemplary embodiment. Terminal coupling devices 72 (e.g., mounting structures, connection fittings, thimbles, metal fittings, pins, rotatably-secured end fittings, etc.) are configured to couple an end portion of a discontinuous or continuous shroud to an attachment point on sailboat 12. Terminal coupling devices 72 are shown receiving and retaining (e.g., securing, confining, pinching, clamping, clasping, etc.) end portions 50, 52 of discontinuous shrouds 46 and continuous shrouds 48 proximate to desired attachment points 36 on sailboat 12. Generally, a terminal coupling device may be coupled to or provide for coupling to an attachment point in an number of manners, including, but not limited to, being coupled with one or more fasteners, being pivotally secured, being rotatably secured, etc.

Discontinuous shrouds 46 are coupled to sailboat 12 by only terminal coupling devices 72. As discussed above, there is typically an attendant weight penalty for each terminal coupling device 72 used in semi-continuous composite rigging system 10 (e.g., because of materials, shape, etc.). This is significant because weight reduction that takes place above the deck allows for a far greater reduction in keel weight. Also, windage caused by terminal coupling devices can result in a loss of performance while sailing. It should be noted that various types of terminal coupling devices may be utilized in a semi-continuous composite rigging system.

In addition to being coupled to sailboat 12 by terminal coupling devices 72 at first end portions 50 and second end portions 52, continuous shrouds 48 are also coupled to sailboat 12 at intermediate locations (e.g., first intermediate location 58, second intermediate location 60, etc.) by a plurality of non-terminal coupling devices 74. Non-terminal coupling devices 74 (e.g., pass-through fittings, branch fittings, tapes, adhesives, etc.) are configured to couple continuous shrouds at intermediate locations to attachment points and permit the continuous shrouds to continue therethrough or therepast. Each non-terminal coupling device 74 (e.g., in FIG. 11A) is shown receiving a continuous shroud at an intermediate location and substantially retaining (e.g., securing, confining, pinching, clamping, clasping, adhering, etc.) that intermediate location proximate to a desired attachment point on sailboat 12. Continuous shrouds 48 are further shown extending outward from non-terminal coupling devices 74 in two or more directions toward attachments points on sailboat 12 (e.g., toward attachment points to which the end portions of the continuous shroud will be coupled by terminal coupling devices 72). Generally, a non-terminal coupling device may be coupled to or provide for coupling to an attachment point in any number of manners, including, but not limited to, being coupled with one or more fasteners, being pivotally and/or rotatably secured, being adhered, being held in place by force from a tensioning member, etc.

Figure 5A:
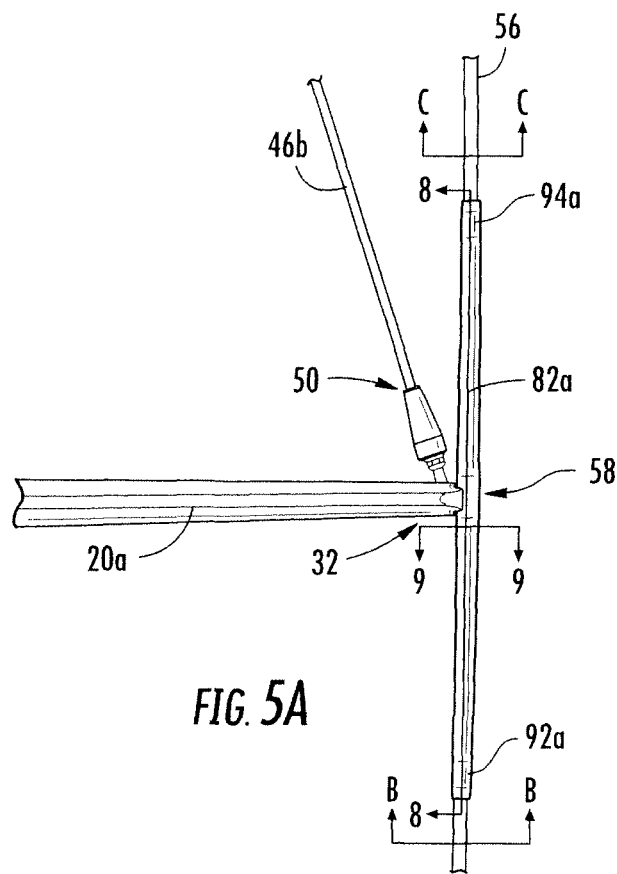
FIG. 5A is a detail view of the exemplary embodiment of a semi-continuous composite rigging system of FIG. 1 taken along the line 5-5.
Figure 5B:
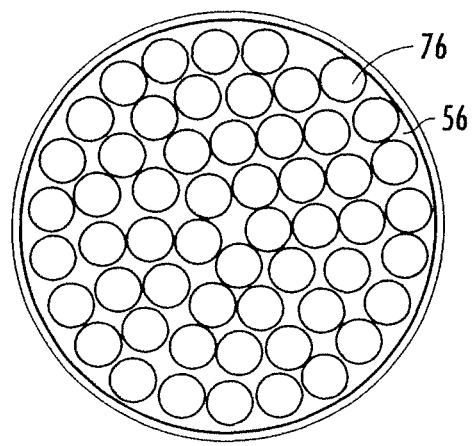
FIG. 5B is a cross section of a continuous shroud of FIG. 5A taken along the line B-B.

Referring to the FIGURES generally, discontinuous shrouds 46 and continuous shrouds 48 shrouds are shown comprising a plurality of elongated composite tensioning member elements shown as composite rods or fibers 76 according to an exemplary embodiment (see, e.g., FIG. 5B illustrating rods 76). The use of high strength and light weight composite fibers with or without a polymer matrix in lieu of metallic wire rope or metallic rod tensioning members can reduce the mast rigging weight and improve sailboat performance, since, as mentioned above, any weight reduction that takes place above the deck allows for a far greater reduction in keel weight. This concept is discussed in more detail in U.S. Pat. No. 7,137,617, entitled "Composite Tensioning Members and Method for Manufacturing the Same," which is hereby incorporated by reference in its entirety. Also, to the extent that the number of shrouds and/or their profiles can be reduced or consolidated, windage can be further reduced.

Rods 76 are shown having circular cross sections and extending substantially parallel to one another (see. e.g., FIG. 5B) according to an exemplary embodiment. Rods 76 are shown bundled (e.g., coupled, bound, bunched, gathered, packaged, etc.) together to define a shroud having a substantially circular cross section. Shrouds having substantially circular cross sections generally have the lowest wind friction draft at all apparent wind angles for conventional sailboats. According to other exemplary embodiments, a shroud comprising fiber composite elements may be assembled to have other cross sections. For example, the fiber composite elements may be assembled to have less frontal area so to achieve lower drag, e.g., for high-speed catamarans and other boats where the apparent wind angle is most generally aligned with the path of the vessel and the lowest frontal area is desired. In other exemplary embodiments, one or more of the shrouds may be otherwise configured (e.g., as a metal rod, as wire rope, etc.). Further, the elongated tensioning member elements may have any of a variety of shapes and/or fiber configurations suitable for use in a rigging system shroud.

Rods 76 may be made from a variety of composite materials, including advanced composite materials. By way of example, and not by way of limitation, some suitable materials having high strength and high modulus fibers include carbon fiber, PBO fiber, and various aramid fibers used along with polymer coatings or as pultruded composite elements made with polymer resins. Bare fiber, coated fiber materials, and pultruded composite materials may also be used if an effective termination is made to attach the fibers to the required end points. Other exemplary materials may include fiber composite elements made from a non-conductive dielectric material such as fiberglass or high modulus/high strength polyethylel with or without a polymer sizing, polymer coating, or polymer matrix.

Referring back to FIG. 1, continuous shrouds 48 are shown tapered, having a percentage of the total number of fiber tensioning member elements that do not extend continuously from deck 16 to top portion 28 of mast 18 according to an exemplary embodiment. Tapered shrouds are configured to improve performance of sailboat 12 by decreasing the weight of the boat aloft. Continuous shrouds 48 are shown tapered in stages (see e.g., FIGS. 5A-5C and 10A-10B), having rods 76 of varying lengths. At one or more locations between first end portion 50 and second end portion 52 of each continuous shroud 48, one or more rods 76 defining a portion of the continuous shroud may terminate. Above the location at which a portion of the rods in a continuous shroud terminate (e.g., farther from deck 16, and closer to top portion 28 of mast 18), fewer rods 76 form the continuous shroud. Accordingly, the cross sections of continuous shrouds 48 are largest proximate deck 16 and may become progressively smaller moving from deck 16 towards top portion 28 of mast 18. Generally, varying the size, length, and/or bundling arrangement of the fiber composite elements provides the ability to fine tune the strength and weight characteristics of semi-continuous composite rigging system 10.

In an exemplary embodiment, one or more shrouds may be tapered by having one or more shroud portions branch (e.g., separate, divide, split, splinter, fork, etc.) therefrom. These branched shroud portions often form generally diagonal shroud portions. For example, the shroud portion may split off from a continuous shroud proximate the free end of the second spreader and be coupled to the mast at or proximate to a fixed end of the third spreader while the continuous shroud is coupled proximate a top portion of a mast. Splitting off shroud portions may decrease the number and/or weight of the coupling devices needed to couple semi-continuous composite rigging system 10 to sailboat 12, thereby decreasing weight aloft and the counterweight required in the keel.

In the exemplary embodiment shown, the use of continuous shrouds 48 that are generally vertical, and discontinuous shrouds 46 that are generally diagonal provides for a rigging system having fewer and/or less severe angular or directional changes along shrouds 34 than a similar continuous rigging system would have. As discussed above, the angular or directional changes along a shroud (e.g., branched shrouds, etc.) are generally more highly stressed. At the locations where there is an angular or directions change, the most highly stressed location is the outside radius of the bend, because, under a tensile load, the outer portion of the shroud has more strain than the inside of the bend portion, and, therefore, can be overloaded beyond the limiting tensile strength properties of the tension member material. A tension member may, however, be tailored to have equal strain in operation across the tension member cross section at any given point along its length. In one exemplary embodiment, the continuous shroud is a composite shroud comprising a plurality of fiber composite elements. The tension member elements of the composite shroud are equally tensioned in the desired path during manufacture such that the fiber composite elements equally share the load during use of the shrouds (e.g., at the bends in the fiber composite elements where the shroud is branched, etc.). Equally tensioning or properly defining the ideal path length for the various fiber elements can be accomplished in several ways. First, the fiber elements can be equally tensioned when the lower (deck level) terminal coupling device is fixed to the collective bundle of fibers. Second, the fiber composite elements can be laid out in their actual system configuration of diagonal and vertical sections such that the actual shape and path length for every fiber element is optimized for strength and uniform loading. This can be accomplished either by hand or by manufacturing tooling and/or machinery wherein the fiber elements are individually shaped to create diagonal or vertical shrouds.

In the exemplary embodiment shown, the use of continuous shrouds in place of multiple discontinuous shrouds in a similar discontinuous rigging system, provides for a rigging system having fewer terminal coupling devices than a similar discontinuous rigging system would have. As discussed above, non-terminal coupling devices are typically lighter, more durable, and more aerodynamic than terminal coupling devices.

FIGS. 2-7 shown some exemplary attachment points at which semi-continuous composite rigging system 10 is coupled to sailboat 12; these attachment points will be discussed by way of example and not by way of limitation.

Figure 2:
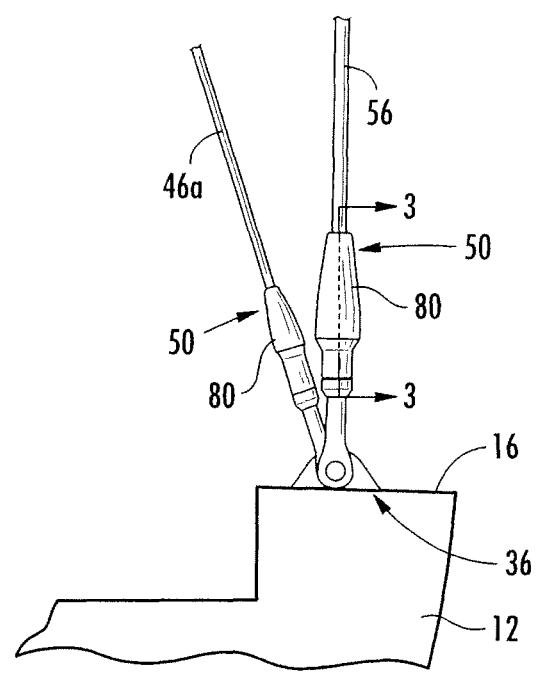
FIG. 2 is a detail view of the exemplary embodiment of a semi-continuous composite rigging system of FIG. 1 taken along the line 2-2.
Figure 3:
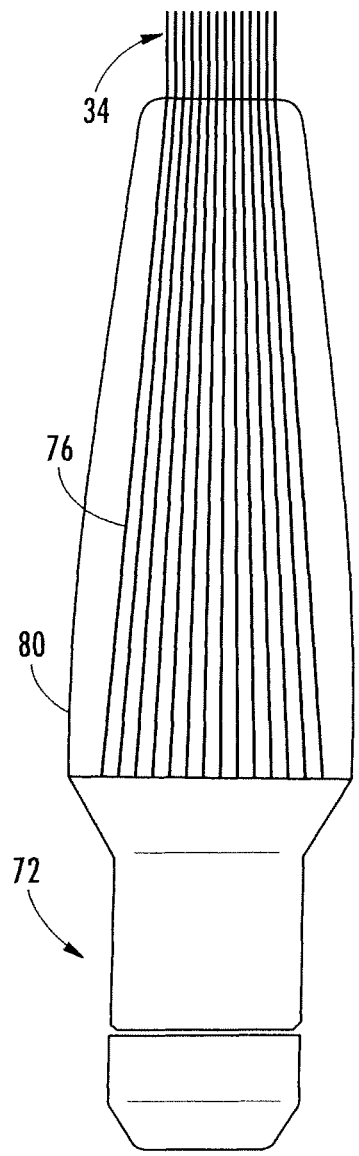
FIG. 3 is a cross section of a terminal coupling device of FIG. 2 taken along the line 3-3.

Referring to FIG. 2, first end portion 50 of first discontinuous shroud 46a is shown coupled to deck 16 at starboard side 24 of sailboat 12 by a terminal coupling device 72, which is shown as a generally conical fitting 80 according to an exemplary embodiment. First end portion 50 of second continuous shroud 56 is also shown coupled to deck 16 of sailboat 12 by a terminal coupling device 72 shown as a substantially conical fitting 80 according to this exemplary embodiment. Referring to FIG. 3, rods 76 are shown spayed within a conical fittings 80 and held therein by a plug according to an exemplary embodiment. The plug may be formed of a resin (e.g., a structural epoxy resin) or other material known in the art. The splaying of the rods is configured to permit good contact between all of the rods and the material of the plug. According to other exemplary embodiments, any coupling device configured to receive and fix an end portion of a shroud relative to an attachment point of a boat may be used (e.g., friction fittings, continuous loop thimbles, cast compression cone fittings, pressing the composite rods around a metal ball in a housing, rotatably-secured end fittings or other coupling devices, etc.).

Figure 4:
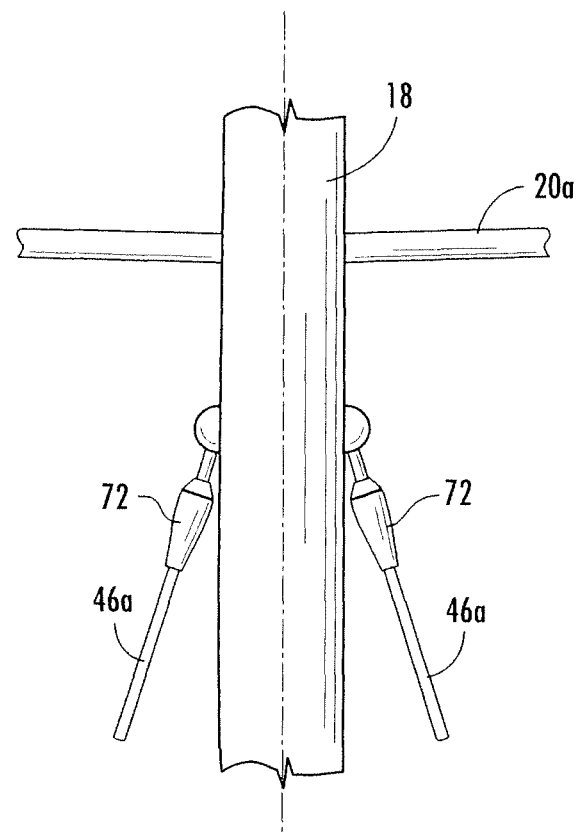
FIG. 4 is a detail view of the exemplary embodiment of a semi-continuous composite rigging system of FIG. 1 taken along the line 4-4.

Referring to FIG. 4, second end portions 52 of first discontinuous shrouds 46a are shown coupled to mast 18 proximate first pair of spreaders 20a by terminal coupling devices 72 according to an exemplary embodiment. Similar to terminal coupling devices 72 shown in FIG. 2, the terminal coupling devices are shown as substantially conical fittings. According to other exemplary embodiments, any coupling device configured to couple an end of a shroud relative to an attachment point of a sailboat or other structure utilizing a standing rigging system may be used (e.g., friction fittings, continuous loop thimbles, cast compression cone fittings, pressing the composite rods around a metal ball in a housing, rotatably-secured end fittings or other coupling devices, etc.).

Figure 5C:
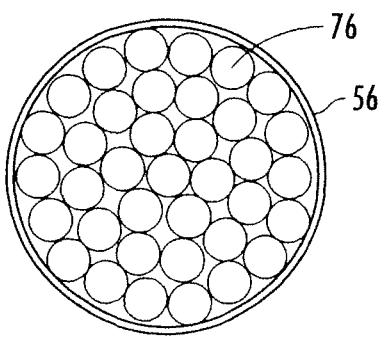
FIG. 5C is a cross section of a continuous shroud of FIG. 5A taken along the line C-C.

Referring to FIGS. 5A-C, semi-continuous composite rigging system 10 is shown including a coupling device shown as a hybrid coupling device 82a according to an exemplary embodiment. Hybrid coupling device 82a is configured to couple one end portion of a discontinuous shroud to an attachment point of sailboat 12 and to couple an intermediate portion of a continuous shroud to an attachment point of sailboat 12. In this way, hybrid coupling device 82a is configured to function both as a terminal coupling device and as a non-terminal coupling device. Such an arrangement may decrease weight, windage, and provide other benefits related to performance considerations (e.g., because the total weight of the hybrid coupling device is less than the combined weight of the terminal and non-terminal coupling devices that would otherwise be used, because the hybrid coupling device has a relatively aerodynamic profile, etc.).

Referring to FIG. 5A, hybrid coupling device 82a is shown coupling first end portion 50 of second discontinuous shroud 46b and first intermediate location 58 of second continuous shroud 56 to sailboat 12 at or proximate to free end 32 of first spreader 20a. As discussed above, second discontinuous shroud 46b extends generally diagonally from free end 32 of first spreader 20 toward mast 18, where second end portion 52 of second discontinuous shroud 46b is coupled to mast 18 proximate to second spreader 20b by a terminal coupling device. Second continuous shroud 56 is disposed generally vertically, extending upward through hybrid coupling device 82a proximate free end 32 of first spreader 20a and toward free end 32 of second spreader 20b.

Figure 6:
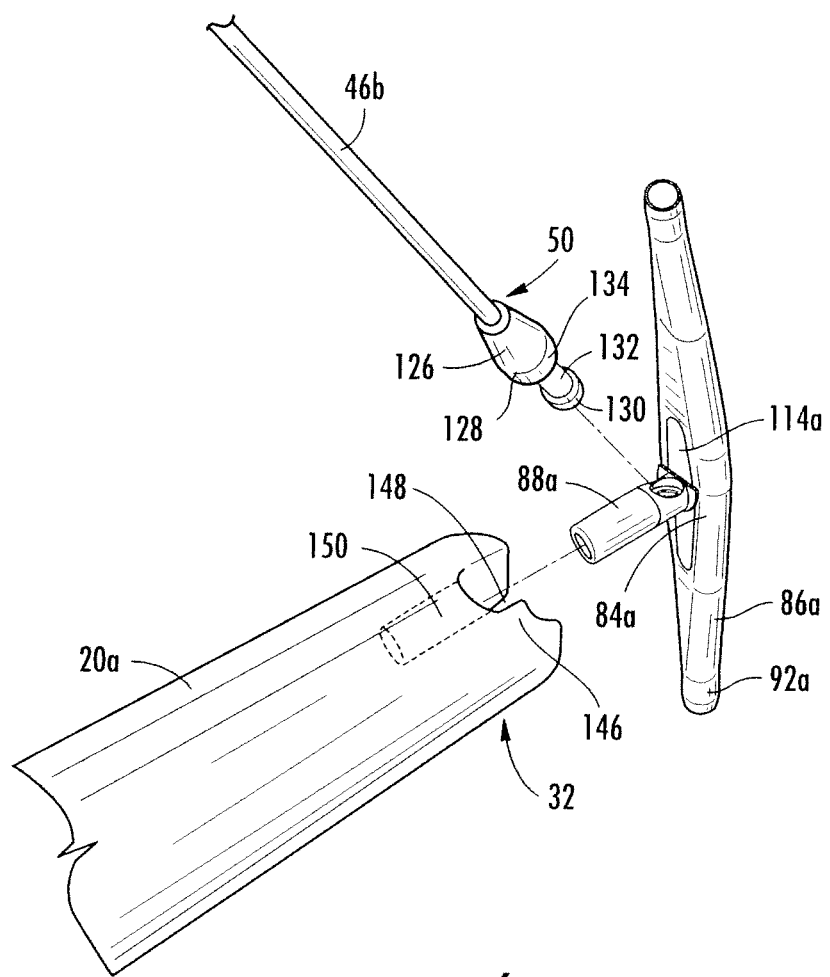
FIG. 6 is an exploded view of the hybrid coupling device and spreader of FIG. 5A.
Figure 7:
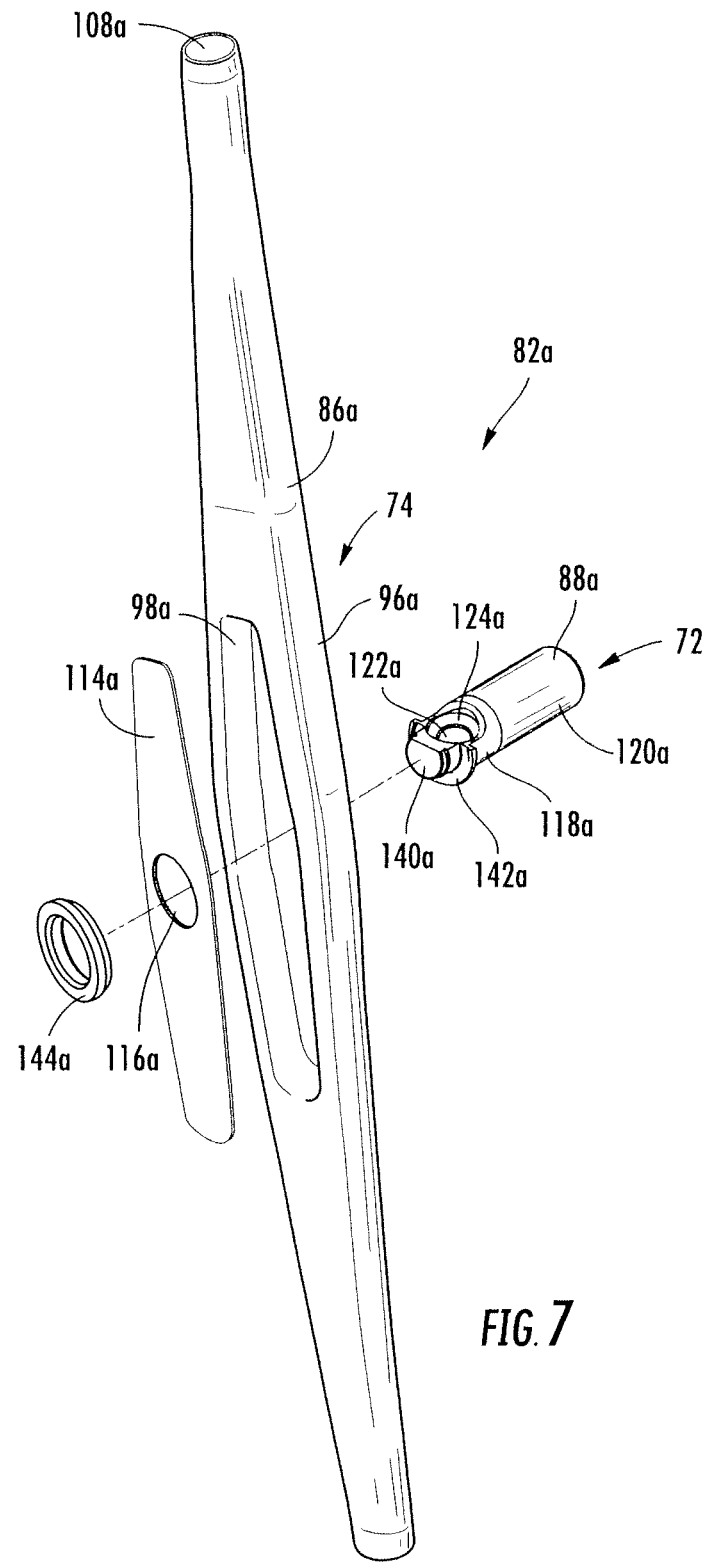
FIG. 7 is an exploded view of the hybrid coupling device of FIG. 5A.

Referring to FIGS. 6-7, hybrid coupling device 82a is shown exploded and including a body 84a having a first body portion 86a and a second body portion 88a according to an exemplary embodiment. First body portion 86a is shown at least partially defining and configured to function as a non-terminal coupling device, coupling second continuous shroud 56 at first intermediate location 58 to free end 32 of first spreader 20a. Second body portion 88a is shown at least partially defining and configured to function as a terminal coupling device, coupling first end portion 50 of second discontinuous shroud 46b to free end 32 of first spreader 20a. Body 84a is shown shaped, sized, and oriented to minimize windage. According to other exemplary embodiments, the body may be shaped and/or sized and/or oriented in any manner sufficient to minimize windage.

Referring to FIGS. 7-8, first body portion 86a of hybrid coupling device 82a is shown including a first end 92a, second end 94a, and at least partially defining a first passage 96a and a second passage 98a according to an exemplary embodiment. As discussed above, first body portion 86a is configured to couple an intermediate location of a continuous shroud to a free end of a spreader and permit the continuous shroud to continue generally vertically therethrough/therepast. Second end 94a is shown disposed generally above first end 92a. Referring to FIG. 8, first passage 96a is shown extending substantially from first end 92a to second end 94a. Second passage 98a is shown extending substantially from first end 92a to second end 94a. First passage 96a and second passage 98a are shown coextensive at or proximate to first end 92a and coextensive at or proximate to second end 94a. First passage 96a and second passage 98a are not coextensive and are spaced a distance apart at a central portion 100a between first end 92a and second end 94a of first body portion 86a. First body portion 86a is shown made of carbon fiber and epoxy, materials which are relatively light weight materials (cf., terminal coupling devices typically formed of metal). According to other exemplary embodiments, other materials may be used (e.g., other materials having high strength and light weight, etc.). According to still other exemplary embodiments, the first body portion may have more or less than two passages and/or these passages may be coextensive or not coextensive at any number of regions or locations of the first body portion.

Referring further to FIG. 8, second continuous shroud 56 is shown split into a first segment 104 and a second segment 106 of rods 76, which are rejoined between first end 92a and second end 94a within hybrid coupling device 82a according to an exemplary embodiment. Second continuous shroud 56 is shown extending through a first opening 102a at first end 92a of first body portion 86a of hybrid coupling device 82a. First segment 104 and second segment 106 of rods 76 of second continuous shroud 56 are split (e.g., separated, etc.) proximate first end 92a of first body portion 86a. First segment 104 of rods 76 of second continuous shroud 56 are shown at least partially disposed (e.g., received, etc.) within first passage 96a, and second segment 106 of rods 76 of second continuous shroud 56 are shown at least partially disposed (e.g., received, etc.) within second passage 98a at central portion 100a. Referring to FIG. 9, first segment 104 and second segment 106 of rods 76 are shown having substantially semi-circular (e.g., D-shaped, etc.) cross sections. Referring back to FIG. 8, first segment 104 and second segment 106 are shown rejoined proximate second end 94a of first body portion 86a and extending through a second opening 108a at second end 94a of first body portion 86a. In other exemplary embodiments, the first segment and the second segment may have cross sections other than semi-circular cross sections. In still other exemplary embodiments, continuous shrouds may not be split and rejoined within the hybrid coupling device, but, rather, remain bundled, having a substantially circular cross section. In still other exemplary embodiments, the first body portion may be sized and/or shaped in any manner sufficient to couple an intermediate location of a continuous shroud to the sailboat (or other structure) and permit the continuous shroud to continue generally therethrough.

Referring further to FIG. 8, a first portion 112 of rods 76 of second continuous shroud 56 are shown terminating at first intermediate location 58 between first end 92a and second end 94a of first body portion 86a of hybrid coupling device 82a according to an exemplary embodiment. As discussed above, shrouds 34 may be tapered by having one or more portions of rods 76 terminate at one or more locations therealong (or by other methods known in the art). Terminating first portion 112 of rods 76 between first end 92a and second end 94a provides for some tapering of second continuous shroud 56 as it extends from deck 16 toward top portion 28 of mast 18. Referring back to FIG. 5B, a cross section of second continuous shroud 56 below first end 92a of first body portion 86a of hybrid coupling device 82a proximate first spreader 20a is shown. Referring back to FIG. 5C, a cross section of second continuous shroud 56 above second end 94a of first body portion 86a proximate first spreader 20a is shown. The cross section of second continuous shroud 56 shown in FIG. 5B is larger and contains more rods than the cross section shown in FIG. 5C.

In an exemplary embodiment, the continuous shrouds are held in position relative to the first body portions of the hybrid coupling devices with a polymer (e.g., an epoxy adhesive, a rubber material, or other thermoset polymers, etc.) injected into the first body portion of the hybrid coupling device. The polymer may be selected to provide a desired modulus of elasticity in order to provide for substantially optimized load sharing among the fiber composite elements. In other exemplary embodiments, other methods of holding (e.g., retaining, securing, etc.) the continuous shrouds in position relative to the first body portion of the hybrid coupling device may be used.

Referring back to FIGS. 6-7, a plate 114a is shown including an aperture 116a and is disposed at least partially between first passage 96a and second passage 98a at central portion 100a of first body portion 86a according to an exemplary embodiment. Plate 114a is configured to provide for coupling of second body portion 88a to first body portion 86a in a manner intended to minimize the bending moment on first spreader 20a (e.g., caused by second continuous shroud 56). Aperture 116a is shown substantially circular and extending through plate 114a. In the exemplary embodiment shown, the plate is shown as an independent component of first body portion. In another exemplary embodiment, plate may be integral with the other components of the first body portion. In still other exemplary embodiments, a feature other than plate may be provided that is configured to provide for coupling the second body portion to the first body portion. In some of these other exemplary embodiments, the feature may provide for coupling in a manner intended to minimize the bending moment on a corresponding spreader.

Referring further to FIGS. 6-7, second body portion 88a of hybrid coupling device 82a is shown as a generally cylindrical member having a first end 118a substantially opposite a second end 120a and an aperture 122a according to an exemplary embodiment. As discussed above, second body portion 88a is configured to provide for first end portion 50 of second discontinuous shroud 46b to be coupled to free end 32 of first spreader 20a. Aperture 122a is shown extending substantially diagonally through second body portion 88a at first end 118a and including a seating region 124a at the top of the second body portion 88a. Second body portion 88a is shown made of titanium, though, may be made of other materials according to other exemplary embodiments (e.g., other high strength materials, etc.). In other exemplary embodiments, the second body portion may be otherwise shaped and/or configured in any manner sufficient to provide for an end portion of a discontinuous shroud to be coupled to a sailboat or other structure thereby.

Referring further to FIGS. 6-7, a terminal coupling device shown as a terminal fitting 126 is shown disposed at first end portion 50 of second discontinuous shroud 46b and at least partially defining the terminal coupling device of hybrid coupling device 82a according to an exemplary embodiment. Terminal fitting 126 is configured to provide for first end portion 50 of second discontinuous shroud 46b to be coupled to free end 32 of first spreader 20 via aperture 122a in second body portion 88a. Terminal fitting 126 is shown including a stop 128, a head 130, and a cylindrical member or hanger 132 extending between stop 128 and head 130. Head 130 is disposed at least partially beneath aperture 122a to couple first end portion 50 of second discontinuous shroud 46b relative to second body portion 88a and is configured to prevent terminal fitting 126 from being pulled upward through second body portion 88a. Stop 128 is shown disposed at least partially above second body portion 88a. Stop 128 is configured to prevent second discontinuous shroud 46b from being pulled downward through aperture 122a. Stop 128 is shown having a diameter larger than that of aperture 122a and including a convex or seated region 134 configured to be seated in seating region 124a of aperture 122a. While seating region 124a and seated region 134 are shown as substantially concave and convex, respectively, these regions may be otherwise shaped or configured to provide for seating of a terminal diagonal fitting relative to a hybrid coupling device or portion thereof.

Cylindrical member 132 extends through aperture 122a. Cylindrical member 132 and stop 128 are configured to allow for some articulation of a head relative to hybrid coupling device 82a to better accommodate tensile forces exerted on hybrid coupling device 82a by second discontinuous shroud 46b. In some exemplary embodiments, the terminal fitting may be another type of fitting or terminal coupling device configured to be coupled to the second body portion. In other exemplary embodiments, other features may define the terminal coupling device that is configured to couple an end portion of a discontinuous shroud to the hybrid coupling device.

Referring further to FIGS. 6-7, second body portion 88a is further configured to be coupled to first body portion 86a. First end 118a of second body portion 88a includes a coupling feature shown as a protrusion or nose 140a and a stop 142a according to an exemplary embodiment. Nose 140a is configured to be received in aperture 116a of plate 114a of first body portion 86a. Nose 140a is shown extending through aperture 116a of plate 114a. Stop 142a is shown disposed approximately between nose 140a and second end 120a of second body portion 88a. Stop 142a is configured to prevent the remainder of the second body portion 88a from being pulled through aperture 116a in plate 114a when semi-continuous composite rigging system 10 is in use. A fastener shown as a nut 144a is shown received on nose 140a to secure second body portion 88a to first body portion 86a. In other exemplary embodiments, other coupling methods and/or devices may be used to couple the second body portion to the first body portion of the hybrid coupling device. Further, the second body portion and the first body portion may be otherwise shaped and arranged relative to one another, may be integral, and/or may have numerous sub-components or coupling features.

Referring to FIG. 6, first spreader 20a is shown including a tip 146, a recess 148 disposed at tip 146, and a cavity 150 extending substantially axially at least partially within first spreader 20a from recess 148 a distance toward mast 18 substantially axially according to a first exemplary embodiment.

Hybrid coupling device 82a is configured to be seated at tip 146 at free end 32 of first spreader 20a. First body portion 86a is configured to be seated in recess 148 at tip 146 of free end 32 of first spreader 20a. First body portion 86a is shown disposed generally vertically and first continuous shroud 54 is shown continuing generally vertically through first body portion 86a of hybrid coupling device 82a (see, e.g., FIG. 5A illustrating first continuous shroud 54 continuing generally vertically through first body portion 86a of hybrid coupling device 82a from deck toward top portion of mast). Second body portion 88a is shown configured to extend axially at least partially into tip 146 of first spreader 20a within cavity 150. Second body portion 88a is shown disposed substantially horizontally, and, accordingly, at an angle to first body portion 86. Second discontinuous shroud 46b is coupled to second body portion 88a and extends generally diagonally (upward and inward) toward mast 18 from second body portion 88a and at an angle thereto. The receipt of second body portion 88a in cavity 150, and the tension in second discontinuous shroud 46b and second continuous shroud 56, are intended to help maintain hybrid coupling device 82a in a desired position relative to first spreader 20a. It should be noted that this seating arrangement can have windage reducing benefits (e.g., components of the hybrid coupling device are partially hidden from the wind by being seated in the spreader, etc.).

Referring to FIG. 6, second discontinuous shroud 46b exerts a bending moment on first spreader 20a. The coupling arrangement of hybrid coupling device 82a is configured to minimize this bending moment according to an exemplary embodiment. By splitting second continuous shroud 56 into first segment 104 and a second segment 106 at central portion 100a of first body portion 86a, first end portion 50 of second discontinuous shroud 46b can be coupled closer to first intermediate location 58 of second continuous shroud 56. The close proximity of first intermediate location 58 of second continuous shroud 56 and first end portion 50 of second discontinuous shroud 46b helps minimize the bending moment on first spreader 20a. According to other exemplary embodiments, the hybrid coupling device may be seated relative to the spreader in any number of manners sufficient to couple the shrouds thereto. In one exemplary embodiment, the hybrid coupling device may be integral or partially integral with a spreader or a component element thereof.

Figure 10A:
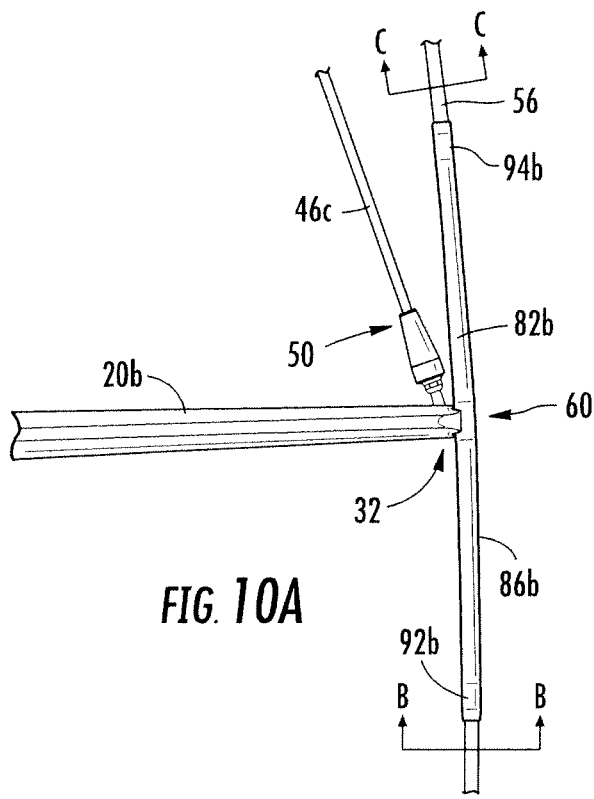
FIG. 10A is a detail view of the exemplary embodiment of a semi-continuous composite rigging system of FIG. 1 taken along the line 10A-10A.

Referring to FIG. 10A, first end portion 50 of third discontinuous shroud 46c and second intermediate location 60 of second continuous shroud 56 are shown coupled to sailboat 12 proximate to free end 32 of second spreader 20b by a hybrid coupling device 82b. Hybrid coupling device 82b is substantially similar to hybrid coupling device 82a shown in FIG. 5A, though, hybrid coupling device 82b is shown having a slightly more pronounced bend in first body portion 86b to accommodate the angular and directional changes of second continuous shroud 56 proximate to second intermediate location 60 than hybrid coupling device 82a. From hybrid coupling device 82b, third discontinuous shroud 46c extends diagonally (generally upward and inward) toward mast 18, where second end portion 52 of third discontinuous shroud 46c is coupled to mast 18 proximate third spreader 20c. Second continuous shroud 56 extends substantially vertically toward free end 32 of third spreader 20b. In another exemplary embodiment, an independent terminal coupling device and a non-terminal coupling device may be provided in lieu of a hybrid coupling device. According to other embodiments, the hybrid coupling device may be configured in any manner sufficient to couple an intermediate portion of a continuous shroud and an end portion of a discontinuous shroud to a sailboat.

Figure 10C:
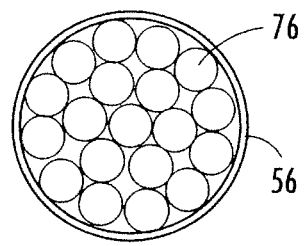
FIG. 10C is a cross section of a continuous shroud of FIG. 10A taken along the line C-C.
Figure 10B:
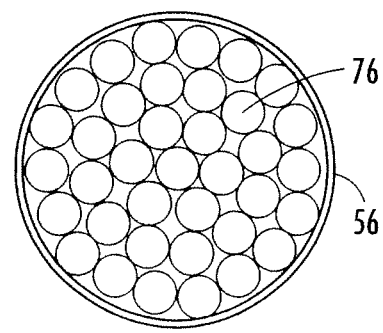
FIG. 10B is a cross section of a continuous shroud of FIG. 10A taken along the line B-B.

Referring to FIGS. 10B-10C, a second portion of rods 76 of second continuous shroud 56 are terminated within hybrid coupling device 82b according to an exemplary embodiment. FIG. 10B shows a cross section of second continuous shroud 56 below first end 92b of first body portion 86b of hybrid coupling device 82b proximate second spreader 20b. FIG. 10C shows a cross section of second continuous shroud 56 above second end 94b of first body portion 86b of hybrid coupling device 82b proximate second spreader 20b. The cross section of second continuous shroud 56 shown in FIG. 10B is larger and contains more rods than the cross section shown in FIG. 10C, indicating the termination of the second portion of the rods and the tapering of the second continuous shroud.

Figure 11A:
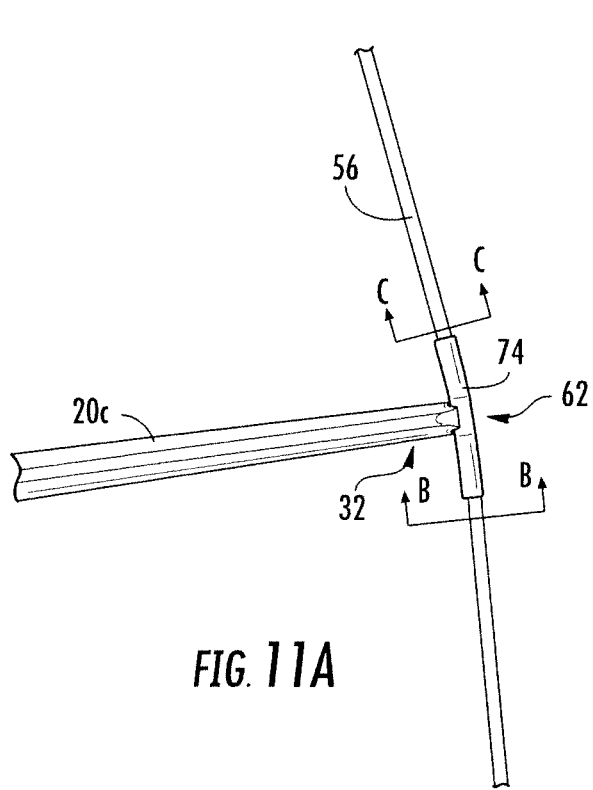
FIG. 11A is a detail view of the exemplary embodiment of a semi-continuous composite rigging system of FIG. 1 taken along the line 11A-11A.

Referring to FIG. 11A, third intermediate location 62 of second continuous shroud 56 is shown coupled to sailboat 12 proximate free end of third spreader 20c by a non-terminal coupling device 74 according to an exemplary embodiment; a discontinuous shroud is not coupled to this non-terminal coupling device. Non-terminal coupling device 74 permits second continuous shroud 56 to enter and continue therethrough. Non-terminal coupling device 74 also accommodates the angular and directional changes of second continuous shroud 56 proximate third intermediate location 62. From this attachment point, second continuous shroud 56 extends generally vertically upwards toward top portion 28 of mast 18, where second end portion 52 of second continuous shroud 56 is coupled by a terminal coupling device (see, e.g., FIG. 12).

Figure 11B:
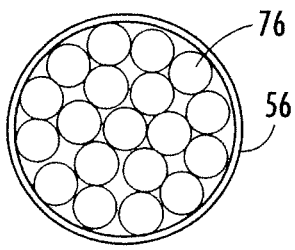
FIG. 11B is a cross section of a continuous shroud of FIG. 11A taken along the line B-B.
Figure 11C:
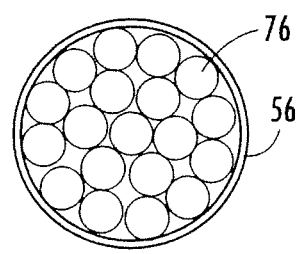
FIG. 11C is a cross section of a continuous shroud of FIG. 11A taken along the line C-C.

Referring to FIGS. 11B-11C, no rods 76 of second continuous shroud 56 are terminated within non-terminal coupling device 74 (as with hybrid coupling device 82a and hybrid coupling device 82b) according to an exemplary embodiment. FIG. 11B shows a cross section of second continuous shroud 56 below non-terminal coupling device 74 proximate to third spreader 20c. FIG. 11C shows a cross section of second continuous shroud 56 above non-terminal coupling device 74 proximate to third spreader 20c. The cross section of second continuous shroud 56 shown in FIG. 11B is substantially the same as the cross section shown in FIG. 11C, showing the termination of the third portion of the rods and the tapering of the second continuous shroud. According to other exemplary embodiments, further tapering of the second continuous shroud may be accomplished by any number of methods at this and/or other locations (e.g., one or more rods could terminate within non-terminal coupling device, etc.). According to still other exemplary embodiments, the first and second continuous shrouds may not be tapered or may be tapered in a different progression than the exemplary tapering progression discussed herein.

Figure 12:
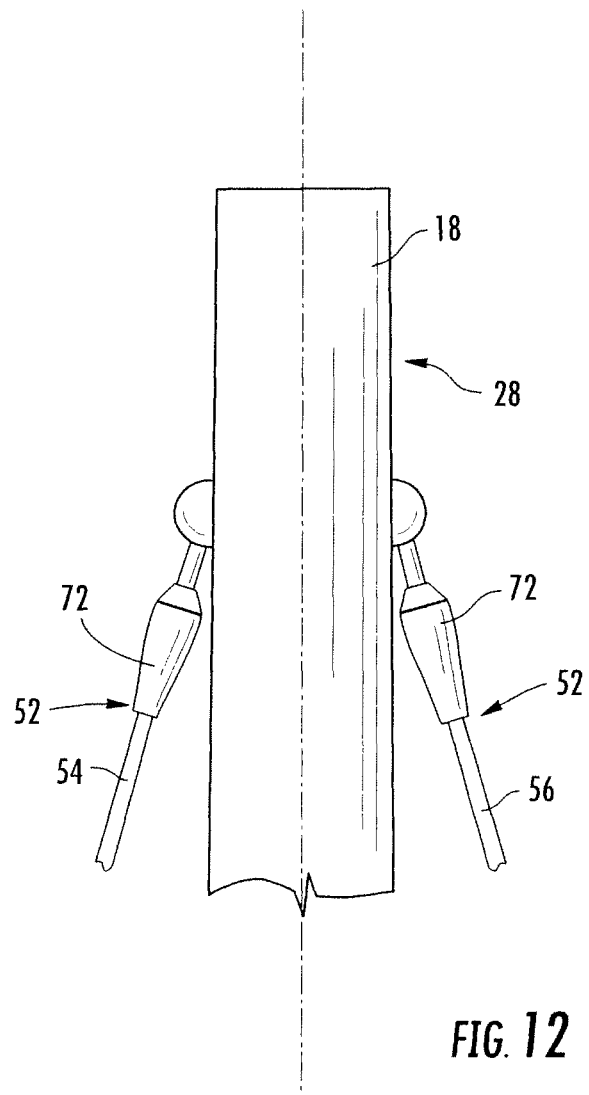
FIG. 12 is a detail view of the exemplary embodiment of a semi-continuous composite rigging system of FIG. 1 taken along the line 12-12.

Referring to FIG. 12, second end portions 52 of first continuous shroud 54 and second continuous shroud 56 are shown coupled to sailboat 12 at top portion 28 of mast 18 and forming a cap according to an exemplary embodiment. As with the other sections of first continuous shroud 54 and second continuous shroud 56, the sections of these shrouds that form the cap are generally vertical sections. First continuous shroud 54 and second continuous shroud 56 are coupled to top portion of mast 18 by terminal coupling devices 72. Similar to the terminal coupling device shown in FIG. 2, the terminal coupling devices 72 are shown as substantially conical fittings. Though, according to other exemplary embodiments, other terminal coupling devices known in the art may be used (e.g., friction fittings, continuous loop thimbles, cast compression cone fittings, pressing the composite rods around a metal ball in a housing, rotatably-secured end fittings or other coupling devices, etc.).

Referring generally to FIGS. 1-12, the terminal coupling devices 72, non-terminal coupling devices 74, and shrouds 34 on starboard side 24 of sailboat 12 are the mirror image of those discussed above as semi-continuous composite rigging system 10 is shown symmetrical.

Figure 13:
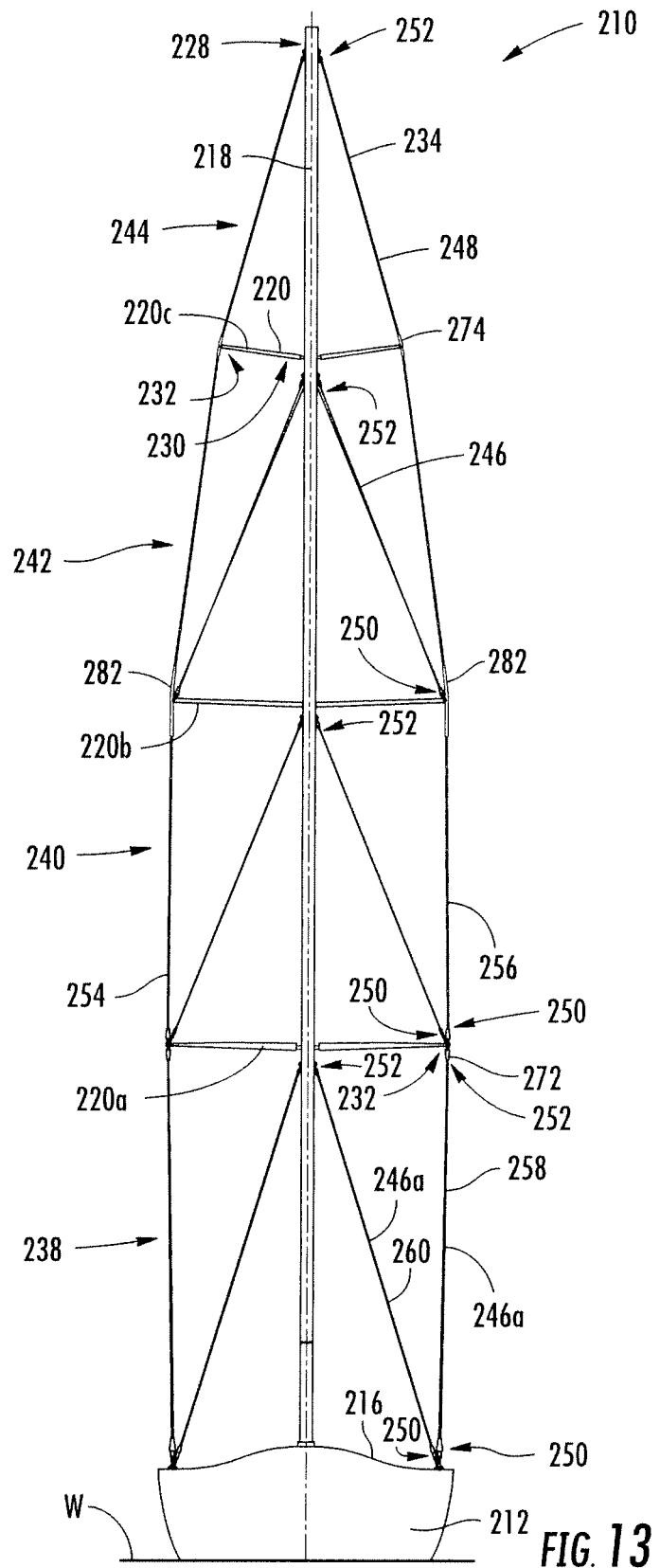
FIG. 13 is a rear elevation view of a semi-continuous composite rigging system according to a second exemplary embodiment.

Referring to FIG. 13, a semi-continuous composite rigging system 210 is shown according to a second exemplary embodiment. Semi-continuous composite rigging system 210 is shown on a sailboat 212. Sailboat 212 is shown including a deck 216, a plurality of spreaders 220, and a mast 218 having a top portion 228 (similar to the semi-continuous composite rigging system 10). Spreaders 220 include a first pair of spreaders 220a, a second pair of spreaders 220b, and a third pair of spreaders 20c, each having a first or free end 232 disposed distal to mast 218 and a second or fixed end 230 disposed proximate to mast 218.

Referring further to FIG. 13, semi-continuous composite rigging system 210 is shown tiered, including a first tier 238, a second tier 240, a third tier 242, and a fourth tier 244 according to an exemplary embodiment. First tier 238 is shown defined generally between and at least partially including deck 216 and first set of spreaders 220a. Second tier 240 is shown defined generally between and at least partially including first set of spreaders 220a and second set of spreaders 220b. Third tier 242 is shown defined generally between and at least partially including second set of spreaders 220b and third set of spreaders 220c. Fourth tier 244 is shown defined generally between and including third set of spreaders 220c and top portion 228 of mast 218. Generally, a sailboat may have more than or less than three sets of spreaders.

Similar to semi-continuous composite rigging system 10, semi-continuous composite rigging system 210 is shown including a plurality shrouds 234 (e.g., cables, ropes, lines, wires, cords, etc.) configured to provide support for mast 218 in order to keep mast 218 substantially vertical and stable. Plurality of shrouds 234 includes a plurality of discontinuous shrouds 246 and a plurality of continuous shrouds 248. Each discontinuous shroud 246 and each continuous shroud 248 includes a first end portion 250 and a second end portion 252.

In contrast to semi-continuous composite rigging system 10, all shrouds corresponding to first tier 238 of semi-continuous composite rigging system 210 are discontinuous shrouds 246a that are coupled to sailboat 212 at their first end portions 250 and second end portions 252 by terminal coupling devices 272 according to the exemplary embodiment shown. Discontinuous shrouds 246a includes two generally vertical discontinuous shrouds 258 and two generally diagonal discontinuous shrouds 260. First end portions 250 of generally vertical discontinuous shrouds 258 are coupled to the deck of sailboat 212 and second end portions 252 are coupled to first set of spreaders 220a proximate free ends 232. First end portions 250 of generally diagonal discontinuous shrouds 260 are each coupled to the deck of sailboat 212 and second end portions 252 are coupled to mast 218 proximate to first spreader 220a.

First end portions 250 of a first continuous shroud 254 and a second continuous shroud 256 are coupled to sailboat 212 at free ends 232 of first pair of spreaders 220a, rather than at deck 216, as in semi-continuous composite rigging system 10. Second end portions 252 of first continuous shroud 254 and second continuous shroud 256 are coupled to sailboat 212 proximate top portion 228 of mast 218.

First continuous shroud 254 and second continuous shroud 256 do not include any branched portions and extend generally vertically from free ends 232 of first pair of spreaders 220a to top portion 228 of mast 218. A plurality of hybrid coupling devices 282 similar to hybrid coupling devices 82 (discussed above) couple to sailboat 212 first continuous shroud 254 and second continuous shroud 256 at intermediate locations therealong. Each hybrid coupling device is at least partially defined by a terminal coupling device 272 and a non-terminal coupling device 274.

In this manner, semi-continuous composite rigging system 210 achieves a different balance of performance considerations for sailboat 212 than semi-continuous composite rigging system 10 achieves for sailboat 12. On one hand, semi-continuous composite rigging system 210 includes more terminal coupling devices than semi-continuous composite rigging system 10, which may add more weight, increases windage, etc. On the other hand, semi-continuous composite rigging system 210 is less likely to have to have a continuous shroud replaced than semi-continuous composite rigging system 10. Shrouds corresponding to a first tier of a standing rigging system are generally subject to damage more often than many other shroud sections corresponding to other tiers of a standing rigging system on a sailboat. In semi-continuous composite rigging system 210, the first tier shrouds are discontinuous shrouds, rather than sections of a continuous shroud, as in semi-continuous composite rigging system 10. Thus, in semi-continuous composite rigging system 210, damage to a shroud corresponding to the first tier requires only that a discontinuous shroud be fixed or replaced, rather than an entire continuous shroud, as in semi-continuous composite rigging system 10, saving expense, time, etc. In other exemplary embodiments, continuous shrouds may extend between any combination of adjacent tiers to achieve a different balance of performance considerations than in semi-continuous composite rigging systems 10 and 210. In still other exemplary embodiments, continuous shrouds may include one or branched portions, eliminating the use of discrete shrouds for diagonal shroud sections at one or more tiers achieving a still different balance of performance considerations.

Referring generally to the FIGURES, it is within the scope of this disclosure to substitute any hybrid coupling device with a terminal and a non-terminal coupling device and substitute discontinuous and continuous shrouds or shroud portions accordingly. Also, it is within the scope of this disclosure to use substantially any combination of hybrid coupling devices, terminal coupling devices, and non-terminal coupling devices in combination with at least one discontinuous shroud and at least one continuous shroud. It is further within the scope of this disclosure to use non-composite shrouds or tensioning members in conjunction with composite tensioning members. It should also be noted that the arrangements and/or concepts disclosed herein have applicability to rigging arrangements other than those on a sailboat (e.g., construction, etc.).

Accordingly, a semi-continuous composite rigging system provides for strategic use of discontinuous shrouds in combination with continuous shrouds to achieve a desired balance of performance characteristics of a sailboat.

According to any preferred embodiment, a semi-continuous composite rigging system for use on a sailboat is provided including at least one discontinuous shroud and at least one continuous shroud. The discontinuous shroud and the continuous shroud each have a first end portion and a second end portion. The first end portion and the second end portion of both the discontinuous shroud and the continuous shroud are coupled to attachment points of the sailboat by terminal coupling devices. One or more intermediate locations of the continuous shroud, located between the first end portion and the second end portion of the continuous shroud, are coupled to attachment points of the sailboat by non-terminal coupling devices. One or more terminal and non-terminal coupling devices may be combined, coupled, or otherwise integrated to form a hybrid coupling device. Any hybrid coupling device may be configured to minimize the bending moment on a spreader caused by one or more shrouds.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the semi-continuous composite rigging system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present inventions.

What is claimed is:

1. A coupling device for a sailboat semi-continuous rigging system, comprising:
    a first body portion configured to receive a continuous shroud and to allow the continuous shroud to pass therethrough, comprising:
        a first end;
        a second end;
        a first passage extending from the first end to the second end; and
        a second passage extending from the first end to the second end, the second passage being coextensive with the first passage at the first end and at the second end, wherein the first passage and the second passage are discrete at a central portion of the first body portion, and wherein the central portion is positioned between the first end and the second end; and
    a second body portion removably coupled by a detachable fastener device to the first body portion and configured to receive an end portion of a discontinuous shroud, the second body portion comprising a protrusion extending through the central portion for coupling the second body portion to the first body portion.

2. The coupling device of claim 1, wherein the first body portion at least partially defines a non-terminal coupling device, the first body portion being configured to couple to the continuous shroud at an intermediate location, the intermediate location being between a first end portion and a second end portion of the continuous shroud, and wherein the second body portion at least partially defines a terminal coupling device, the second body portion being configured to couple to the discontinuous shroud at one of a first end portion and a second end portion of the discontinuous shroud.

3. The coupling device of claim 1, wherein the coupling device being further configured to be seated at a tip of a spreader on the sailboat, and wherein the first body portion is disposed generally vertically.

4. The coupling device of claim 3, wherein the second body portion of the coupling device is configured to extend substantially axially at least partially into the spreader.

5. The coupling device of claim 1, wherein the first passage and the second passage are spaced a distance apart between the first end and the second end, and wherein the second body portion is removably coupled to the first body portion between the first passage and the second passage.

6. The coupling device of claim 1, wherein the continuous shroud includes a first segment and a second segment, the first segment being at least partially received in the first passage of the first body portion and the second segment being at least partially received in the second passage of the first body portion.

7. The coupling device of claim 6, wherein the first passage and the second passage are not coextensive and are spaced a distance apart at a central portion of the first body portion, separating the first segment and the second segment of the continuous shroud at the central portion of the first body portion.

8. The coupling device of claim 7, wherein the second body portion is coupled to the first body portion at the central portion at least partially between the first passage and the second passage and at least partially between the first segment and the second segment of the continuous shroud.

9. The coupling device of claim 8, wherein the location at which the first end portion of the discontinuous shroud is coupled to the spreader is proximate to the location at which the intermediate location of the continuous shroud is coupled to the spreader to minimize a bending moment created on the spreader by the continuous shroud.

10. The coupling device of claim 1, wherein the fastener device is removably coupled to the protrusion in order to removably couple the second body portion to the first body portion.

11. The coupling device of claim 1, wherein the second body portion comprises an angled aperture for receiving the end portion of the discontinuous shroud.

12. A coupling device for a sailboat rigging system having a first shroud and a second shroud, the coupling device comprising:
    a first body portion configured to receive the first shroud and to allow the first shroud to pass therethrough, the first body portion comprising:
        a first end;
        a second end;
        a first passage extending from the first end to the second end;
        a second passage extending from the first end to the second end, the second passage being coextensive with the first passage at the first end and at the second end, wherein the first passage and the second passage are discrete at a central portion of the first body portion, and wherein the central portion is positioned between the first end and the second end; and
        a plate positioned between the first passage and the second passage; and
    a second body portion removably coupled by a detachable fastener device to the plate of the first body portion and configured to receive an end portion of the second shroud.

13. The coupling device of claim 12, wherein the first body portion at least partially defines a non-terminal coupling device, the first body portion being configured to couple to the shroud at an intermediate location, the intermediate location being between a first end portion and a second end portion of the first shroud, and wherein the second body portion at least partially defines a terminal coupling device, the second body portion being configured to couple to the shroud at one of a first end portion and a second end portion of the second shroud.

14. The coupling device of claim 12, wherein the first body portion is disposed generally vertically.

15. The coupling device of claim 12, wherein the coupling device being further configured to be seated at a tip of a spreader on the sailboat, and wherein the second body portion of the coupling device is configured to extend substantially axially at least partially into the spreader.

16. The coupling device of claim 12, wherein the second body portion comprises a stop that interfaces with the first body portion to prevent the second body portion from being pulled through the first body portion.

17. A coupling device for a rigging system for a sailboat having a mast and a first shroud and a diagonal second shroud configured to at least partially support the mast, the coupling device comprising:
    a first body portion configured to permit the first shroud to extend therethrough;
    a second body portion coupled to a first end portion of the diagonal second shroud;
    wherein the first body portion includes a first end, a second end, a first passage extending from the first end to the second end to receive a first portion of the first shroud, and a second passage extending from the first end to the second end to receive a second portion of the first shroud;
    wherein the first and second passages are:
        coextensive at the first end and at the second end of the first body portion, and
        spaced apart and separated by an intermediate portion located between the first end and the second end of the first body portion;
    wherein the second body portion is coupled to the intermediate portion of the first body portion to couple the first shroud to the mast.

18. The coupling device of claim 17, wherein the first shroud includes a first segment and a second segment, the first segment being at least partially received in the first passage of the first body portion and the second segment being at least partially received in the second passage of the first body portion.

19. The coupling device of claim 18, wherein the second body portion is coupled to the first body portion at the central portion at least partially between the first passage and the second passage and at least partially between the first segment and the second segment of the first shroud.

20. The coupling device of claim 17, wherein the first passage and the second passage are not coextensive and are spaced a distance apart at a central portion of the first body portion, separating the first segment and the second segment of the first shroud at the central portion of the first body portion.

21. The coupling device of claim 20, wherein the location at which the first end portion of the diagonal second shroud is coupled to a spreader of the sailboat is proximate to the location at which the intermediate location of the first shroud is coupled to the spreader to minimize a bending moment created on the spreader by the first shroud.

\* \* \* \* \*